United States Patent Office 3,410,866
Patented Nov. 12, 1968

3,410,866
ISOCYANATES OF SELECTED FLUORO-ALKYLIMIDAZOLINES
William J. Middleton, Wilmington, Del., assignor to E. I. du Pont de Nemours and Company, Wilmington, Del., a corporation of Delaware
No Drawing. Continuation-in-part of application Ser. No. 521,317, Feb. 9, 1966, which is a continuation-in-part of application Ser. No. 461,151, June 3, 1965, which is a continuation-in-part of abandoned application Ser. No. 439,476, Mar. 12, 1965. This application Apr. 15, 1966, Ser. No. 542,751
4 Claims. (Cl. 260—309.6)

ABSTRACT OF THE DISCLOSURE

Described and claimed are iscoyanates of fluoroalkylimidazolines, e.g., 4-isocyanato-2,2,5,5-tetrakis(trifluoromethyl)-3-imidazoline, useful for modifying polymers and as agents for waterproofing paper. The compounds are prepared from oxalyl chloride and the corresponding 4-amino-3-imidazoline or its tautomer.

---

This application is a continuation-in-part of my coassigned copending application Ser. No. 521,317, filed Feb. 9, 1966, as a continuation-in-part of my copending application Ser. No. 461,151, filed June 3, 1965, and now abandoned itself a continuation-in-part of my now-abandoned application Ser. No. 439,476, filed Mar. 12, 1965.

FIELD OF THE INVENTION

This invention relates to, and has as its principal objects provision of, isocyanates of certain selected fluoroalkylimidazolines and the preparation of the same.

DETAILS OF THE INVENTION

The new compounds of this invention are 4-isocyanato-2,2,5,5 - tetrakis(polyhalomethyl) - 3-imidiazolines of the general formula (I)

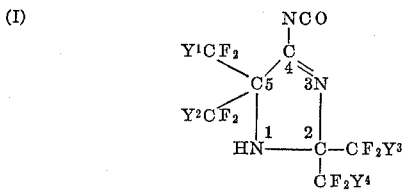

where $Y^1$, $Y^2$, $Y^3$ and $Y^4$ may be alike or different and are hydrogen, chlorine or fluorine. These novel compounds are formed from the 4-amino-3-imidazoline compounds or their tautomers, the 4-iminoimidazolidines, of the formula (II)

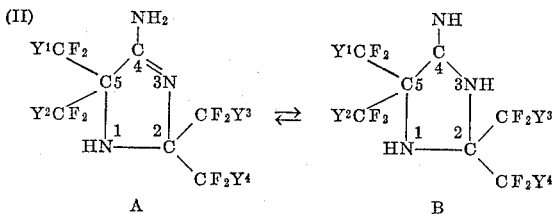

where the symbols are as defined above, by reaction of the same with oxalyl chloride. The compounds of Formulas IIA and B exist in equilibrium, especially in solution, and reference to either form in this specification is to be understood as including the other.

The reaction between the amino compound and oxalyl chloride is accomplished without solvent or in an inert solvent at ambient or slightly elevated temperatures, e.g., at the reflux temperature of the reaction mixture. Preferably, a one-to-one molar proportion of amino compound and oxalyl chloride is employed although an excess of oxalyl chloride will have no adverse effects. Essentially anhydrous conditions should be maintained throughout this process and traces of moisture in the reactants, solvents, apparatus or in contact with the isocyanate product will lower the yield. Even moderate amounts of water will not, however, make the process inoperable.

Any inert solvent, usually of B.P. 25–100° C., may be used; ethers and particularly diethyl ether, are preferred. Higher boiling ethers such as dioxane, ethylene glycol dimethyl ether, and the like may be employed to advantage if the amino compound reactant is less reactive toward oxalyl chloride than usual. Other operable solvents include: hydrocarbons, e.g., benzene, toluene, the xylenes; and chlorinated hydrocarbons, e.g., chloroform and chlorobenzene. An excess of oxalyl chloride can also be used to advantage as solvent.

Best results occur when the amino compound is added to the oxalyl chloride so that an excess of the latter is present to prevent a side reaction between the amino compound and the product isocyanate. Conveniently, the amino reactant is dissolved in the solvent and added dropwise to a stirred solution of oxalyl chloride in the solvent. It is preferred that the addition take at least 10 minutes, but this will depend on the reaction scale. Time and temperature are not critical but 0.5–2 hours at 25–100° C. are usually employed. The products are isolated by ordinary techniques, e.g, distillation.

The compounds of Formula II used in preparing the isocyanates of this invention can be prepared by reacting three moles of an imine of the formula (III)

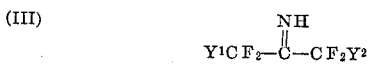

wherein $Y^1$ and $Y^2$ have the meanings given above, with one mole of an alkali metal cyanide, e.g., sodium or potassium cyanide, at −40° to 100° C. to form a polyhalomethylethylimine-substituted intermediate, followed by heating the intermediate to eliminate the polyhalomethylethylimine substituent. This heating is preferably done in an acid such as a mineral acid and preferably in concentrated sulfuric acid. If it is desired that $Y^3$ and $Y^4$ be different from the $Y^1$ and $Y^2$ in the product being prepared, more than one polyhaloalkylidenimine must be employed in the reaction mixture and this will result in more than one product being formed. The reaction of the polyhaloalkylidenimine with the alkali metal cyanide is preferably carried out in an inert reaction medium such as dimethylformamide; dimethyl sulfoxide; liquid nitriles, e.g., acetonitrile and benzonitrile; glycol ethers, e.g., the dimethyl ethers of ethylene and diethylene glycols; etc. This process is described in greater detail in my above-mentioned application Ser. No. 521,317.

The imines of Formula III used as starting materials in the above-described process can be prepared in various ways. Those in which $Y^1$ and $Y^2$ in the formula are fluorine or chlorine can be prepared as shown in my U.S. Patent No. 3,226,439 and in J. Org. Chem. 30, 1398 (1965). Those in which $Y^1$ or $Y^2$, or both, are hydrogen, can be prepared by a modification of the method of Zeifman et al., Akad. nauk. S.S.S.R. Doklady, 153, 1334 (1963), for preparing hexafluoroisopropylidenimine. The process for preparing pentafluoroisopropylidenimine involves first reacting pentafluoroacetone with phenyl isocyanate at about 200° C. in the presence of a catalytic amount of a triarylphosphine oxide to form N-phenylpentafluoroisopropylidenimine, which is then treated with ammonia to give N-phenyl-2,2-diaminopentafluoropropane. This product, which need not be isolated or purified prior to the next and last step, is then reacted with phosphorus pentoxide, whereby it splits off aniline with formation of pentafluoroisopropylidenimine (U.S. Pat. 3,342,864).

SPECIFIC EMBODIMENTS OF THE INVENTION

There follow some nonlimiting examples illustrating the invention in more detail. In carrying out these examples, essentially anhydrous conditions were maintained.

Example 1.—4 - isocyanato - 2,2,5,5 - tetrakis(trifluoromethyl)-3-imidazoline

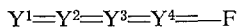

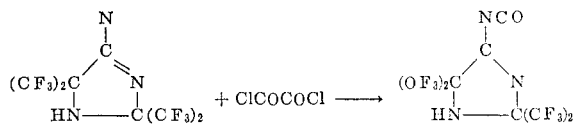

A three-necked flask attached to the bottom of a spinning-band fractionating column was equipped with a magnetic stirrer, nitrogen inlet and dropping funnel. The equipment was flame-dried and cooled; then 15 ml. of oxalyl chloride and 75 ml. of anhydrous diethyl ether were introduced into the flask at ambient temperature under positive nitrogen pressure. To this a solution of 30 g. of 4 - amino-2,2,5,5-tetrakis(trifluoromethyl)-3-imidazoline dissolved in 100 ml. of ether was added over 30 minutes with vigorous stirring. After stirring an additional 20 minutes, the ether was removed by distillation at a moderate rate and the residue distilled at 75 mm. The product, 4 - isocyanato - 2,2,5,5 - tetrakis(trifluoromethyl)-3-imidazoline, B.P. 78° C. (75 mm.), 25.7 g., was collected in oven-dried vials (as it reacts with moist air). The $H^1$ nuclear magnetic resonance spectrum (n.m.r.) showed a singlet (broad) at 3.6 p.p.m. The $F^{19}$ n.m.r. spectrum showed a pair of septets (J=5) at +73.3 and +78.0 p.p.m. from external $FCCl_3$ at 56.4 mc.

Analysis.—Calcd. for $C_8HN_3OF_{12}$ (383.12): C, 25.08; H, 0.26; N, 10.96. Found: C, 25.58; H, 0.77; N, 11.51.

The 4 - amino - 2,2,5,5 - tetrakis(trifluoromethyl) - 3-imidazoline starting material for Example 1 was prepared by slowly distilling 3 moles of hexafluoroisopropylidenimine into a stirred suspension of 1 mole of powdered sodium cyanide in dimethyl sulfoxide. An exothermic reaction occurred and the rate of addition of the imine was adjusted so that the temperature of the reaction mixture did not rise above 65° C. At the end of the addition, the homogeneous reaction mixture was cooled to 20° C. and poured into aqueous 10% hydrochloric acid. The oil phase that separated was washed and dried, and there was obtained the white solid intermediate 4-[1-amino-2,2,2 - trifluoro - 1 - (trifluoromethyl)ethylamino] - 2,2, 5,5-tetrakis(trifluoromethyl)-3-imidazoline. This intermediate was then dissolved in concentrated sulfuric acid and the stirred solution was heated slowly to 150° C. and held at that temperature for 10 minutes. The solution was then cooled to 20° C. and poured onto crushed ice. The resulting white solid was filtered from the melted ice, washed, and recrystallized from alcohol-water (1:2). This solid was 4-amino-2,2,5,5-tetrakis(trifluoromethyl)-3-imidazoline and/or its tautomer 4-imino-2,2,5,5-tetrakis-(trifluoromethyl)imidazolidine.

Example 2.—4-isocyanato-2,2,5,5-tetrakis(trifluoromethyl)-3-imidazoline

A solution of 30 g. of 4-amino-2,2,5,5-tetrakis(trifluoromethyl)-3-imidazoline, or its tautomeric form, 4-imino-2,2,5,5-tetrakis(trifluoromethyl)imidazolidine, in 100 ml. of oxalyl chloride was stirred at 25° C. for 3 days, and then distilled. There was obtained 26.05 g. (81%) of 4-isocyanato - 2,2,5,5 - tetrakis(trifluoromethyl) - 3 - imidazoline as a colorless liquid, B.P. 67-67.5° C. (49 mm.).

Example 3.—4 - isocyanato - 2,2,5,5 - tetrakis(chlorodifluoromethyl)-3-imidazoline

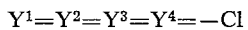

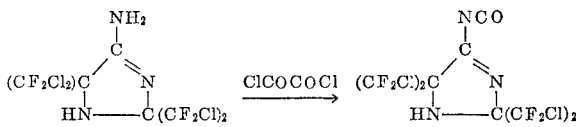

With the use of apparatus and techniques described in Example 1, 3.4 g. of 4-isocyanato-2,2,5,5-tetrakis(chlorodifluoromethyl)-3-imidazoline, B.P. 78° C. (1.5 mm.), was prepared by adding 5.0 g. of the amino-3-imidazoline dissolved in 20 ml. of ether dropwise over 30 min. to 3 ml. of oxalyl chloride dissolved in 10 ml. of ether. After stirring for 20 min. at room temperature the reaction mixture was distilled. The $H^1$ n.m.r. spectrum of the product shows a single NH-band at τ 5.96 ($CCl_4$). The $F^{19}$ n.m.r. spectrum shows four complex multiplets at +2990, 3114, 3278 and 3309 c.p.s. from external $FCCl_3$ at 56.4 mc. The infrared spectrum shows a strong band at 2300 cm.$^{-1}$ (4.3μ) characteristic of an isocyanate.

Analysis.—Calcd. for $C_8HN_3OCl_4F_8$ (448.94): C, 21.89; H, 0.22. Found: C, 21.79; H, 0.65.

The 4 - amino - 2,2,5,5 - tetrakis(chlorodifluoromethyl)-3-imidazoline starting material for Example 3 was prepared by adding powdered sodium cyanide portion-wise to a stirred solution of an equimolar amount of 1,3-dichloro-1,1,3,3-tetrafluoroisopropylidenimine (Example III of U.S. Patent No. 3,226,439) and dimethylformamide cooled to 0° C. As the addition proceeded, the reaction mixture warmed slightly and the rate of addition was adjusted so that the reaction temperature remained below 10° C. At the completion of the addition, the reaction mixture was poured into aqueous 10% hydrochloric acid to give crude 4 - [1 - amino - 2 - chloro - 2,2 - difluoro - 1 - (chlorodifluoromethyl)ethylamino] - 2,2,5,5 - tetrakis(chlorodifluoromethyl)-3-imidazoline as an oil. After washing, this intermediate was dissolved in 20% fuming sulfuric acid and the solution was heated to 150° C. The solution was then cooled and poured over crushed ice to give a solid which was collected on a filter, washed with water and dried. This product was 4-amino-2,2,5,5-tetrakis(chlorodifluoromethyl)-3-imidazoline, and/or its tautomer.

Example 4.—4-isocyanato-5,5-bis(chlorodifluoromethyl)-2,2-bis(trifluoromethyl)-3-imidazoline

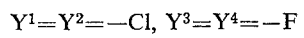

A. Powdered sodium cyanide, 6.53 g. (0.133 mole), was added portionwise over a period of 30 minutes to a stirred solution of 33.0 g. (0.2 mole) of hexafluoroisopropylidineimine and 39.6 g. (0.2 mole) of 1,3-dichlorotetrafluoroisopropylidineimine in 150 ml. of dimethylformamide cooled to —30° C. The reaction mixture was stirred for one hour at —30° and then warmed to 25° C. and mixed with 200 ml. of 10% hydrochloric acid. The organic layer was washed twice with water and then dissolved in 40 ml. of 20% fuming sulfuric acid. This solution was heated to 150° C. and then cooled and poured over 100 ml. of crushed ice. The solid that formed was collected on a filter, washed with water, dried and sublimed at 150° C. (10 mm.). There was obtained 33.0 g. of a mixture of imidazolines as a white crystalline powder, M.P. 118-155° C.

B. A solution of 30.0 g. of the above-described mixture of imidazolines in 100 g. of oxalyl chloride was stirred at 25° C. for three days and then distilled. There was obtained (A) 9.10 g. of 4-isocyanato-2,2,5,5-tetrakis(trifluoromethyl)-3-imidazoline, B.P. 70.0-70.5° C. (48 mm.); (B) 9.02 g. of 4-isocyanato-5,5-bis(chlorodifluoromethyl) - 2,2 - bis(trifluoromethyl)-3-imidazoline as a colorless liquid, B.P. 104-105° C. (48 mm.); and (C) 8.65 g. of 4-isocyanato-2,2,5,5-tetrakis(chlorodifluoromethyl)-3-imidazoline, B.P. 142-144° C. (48 mm.).

The $F^{19}$ n.m.r. spectrum of the sample of 4-isocyanato- 5,5 - bis(chlorodifluoromethyl)-2,2-bis(trifluoromethyl)-3-imidazoline indicates that this sample also contained a minor amount (8–9%) of the isomeric 4-isocyanato-2,2-bis(chlorodifluoromethyl) - 5,5 - bis(trifluoromethyl)-3-imidazoline, for the sample had two absorptions in the $CF_3$ region: one multiplet at +76.0 p.p.m. (relative area 91–92%) and one multiplet at +71.2 p.p.m. (relative area 8–9%) from $FCCl_3$. The infrared spectrum showed a strong band at 4.40μ for NCO.

*Analysis.*—Calcd. for $C_8HCl_2F_{10}N_3O$: C, 23.10; H, 0.24; Cl, 17.05; F, 45.67. Found: C, 23.23; H, 0.57; Cl, 17.07; F, 45.37.

The following table lists additional specific products of the invention and the reactants from which they are prepared, e.g., essentially by the processes of Examples 1–4.

TABLE

| Amino Reactant | Isocyanate |
|---|---|
| ![structure] $ClCF_2$, $CF_3$, $CF_2Cl$, $CF_3$ with $NH_2$ | ![structure] with $NCO$ |
| $HCF_2$, $CF_3$, $CF_2H$, $CF_3$ with $NH_2$ | corresponding $NCO$ |
| $CF_3$, $CF_2Cl$, $CF_3$, $CF_2H$ with $NH_2$ | corresponding $NCO$ |
| $ClCF_2$, $HCF_2$, $CF_3$, $CF_3$ with $NH_2$ | corresponding $NCO$ |
| $HCF_2$, $HCF_2$, $CF_3$, $CF_2Cl$ with $NH_2$ | corresponding $NCO$ |
| $C_3F_7$, $CF_3$, $CF_3$, $CF_3$ with $NH_2$ | corresponding $NCO$ |

The isocyanate products of this invention are useful in various applications. More specifically, the compounds are useful for modifying polymers. The following Example A illustrates the modification of polyvinyl alcohol by 4 - isocyanato-2,2,5,5-tetrakis(trifluoromethyl)-3-imidazoline:

Example A

A suspension of 0.25 g. of polyvinyl alcohol (99% hydrolyzed polyvinyl acetate) was stirred for 20 hours in 50 ml. of hexamethylphosphonamide. 4-isocyanato-2,2,5,5-tetrakis(trifluoromethyl)-3-imidazoline, 0.5 g., was added to the suspension, and stirring was continued for 1 hour. Most of the suspended material dissolved. Ether was added to cause the polymer to precipitate, and the precipitated polymer was collected on a filter, washed thoroughly with ether and then with water, and dried in air. There was obtained 0.62 g. of white polymer insoluble in water. A flexible oil- and water-repellant film was pressed from the polymer at 100° C. and 10,000 lbs. ram pressure. Such modified polyvinyl alcohol films are especially useful as oil- and water-repellent wrappings or coatings for many articles.

The isocyanate products of this invention are also useful as agents for water-proofing paper. The following example illustrates this utility:

Example B

A strip of ordinary filter paper was placed in a test-tube and dried with a warm air stream. A sample of 4 - isocyanato-2,2,5,5-tetrakis(trifluoromethyl)-3-imidazoline (Example 1) vapor at >155° C. was placed in the tube to penetrate the filter paper. On cooling, the paper so treated was rendered water-proof, while another strip of paper, identical except for such treatment was wetted immediately. The difference in results demonstrates the usefulness of these isocyanates as agents for water-proofing paper.

The products of this invention are also useful as intermediates for the preparation of carboalkoxyiminoimidazolidines, carbamyliminoimidazolidines and disubstituted ureas, as described in my above-mentioned U.S. application Ser. No. 521,317.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

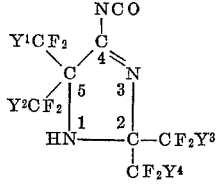

wherein $Y^1$, $Y^2$, $Y^3$ and $Y^4$ are alike or different and are selected from the group consisting of hydrogen, chlorine and fluorine.

2. The compound of claim 1 in which $$Y^1=Y^2=Y^3=Y^4=-F$$

4-isocyanato - 2,2,5,5 - tetrakis(trifluoromethyl)-3-imidazoline.

3. The compound of claim 1 in which $$Y^1=Y^2=Y^3=Y^4=-Cl$$

4-isocyanato - 2,2,5,5 - tetrakis(chlorodifluoromethyl)-3-imidazoline.

4. The compound of claim 1 in which $Y^1=Y^2=-Cl$, and $Y^3=Y^4=-F$, 4-isocyanato - 5,5 - bis(chlorodifluoromethyl)-2,2-bis(trifluoromethyl)-3-imidazoline.

References Cited

UNITED STATES PATENTS 2,915,528  12/1959  Raifsnider _____ 260—309.6

OTHER REFERENCES

Speziale et al.: Jour. Org. Chem., vol. 27, pp. 3742–43 (1962).

HENRY R. JILES, *Primary Examiner.*

N. TROUSOF, *Assistant Examiner.*